US006992586B2

(12) United States Patent
Rosenfeld

(10) Patent No.: US 6,992,586 B2
(45) Date of Patent: Jan. 31, 2006

(54) METHODS OF CONDUCTING PROMOTIONAL CONTESTS AND BEVERAGE CONTAINERS FOR USE THEREIN

(75) Inventor: Aron M. Rosenfeld, Palo Alto, CA (US)

(73) Assignee: Novelis, Inc., Toronto (CA)

( * ) Notice: Subject to any disclaimer, the term of this patent is extended or adjusted under 35 U.S.C. 154(b) by 69 days.

(21) Appl. No.: 10/261,962

(22) Filed: Oct. 1, 2002

(65) Prior Publication Data

US 2004/0064362 A1 Apr. 1, 2004

(51) Int. Cl.
*G08B 13/14* (2006.01)

(52) U.S. Cl. .............................. 340/572.1; 340/572.4; 340/572.8

(58) Field of Classification Search ............ 340/572.1, 340/572.4, 572.8, 384.1, 384.73; 235/383, 235/375; 705/14
See application file for complete search history.

(56) References Cited

U.S. PATENT DOCUMENTS

| | | | | |
|---|---|---|---|---|
| 4,326,198 | A * | 4/1982 | Novikoff | 340/572.2 |
| 4,398,491 | A * | 8/1983 | Fridl et al. | 116/67 R |
| 4,673,923 | A | 6/1987 | Boscoe et al. | 340/572.1 |
| 4,835,524 | A | 5/1989 | Lamond et al. | 340/572.1 |
| 5,353,011 | A * | 10/1994 | Wheeler et al. | 340/572.4 |
| 5,464,092 | A * | 11/1995 | Seeley | 206/217 |
| 5,575,383 | A * | 11/1996 | Seeley | 206/217 |
| 5,625,347 | A * | 4/1997 | MacLean et al. | 340/568.1 |
| 5,754,110 | A | 5/1998 | Appalucci et al. | 340/572.1 |
| 5,813,563 | A * | 9/1998 | Boehm et al. | 220/552 |
| 5,861,809 | A | 1/1999 | Eckstein et al. | 340/572.1 |
| 5,909,793 | A * | 6/1999 | Beach et al. | 194/210 |
| 5,923,242 | A * | 7/1999 | Slagle et al. | 340/328 |
| 5,947,256 | A | 9/1999 | Patterson | |
| 5,954,214 | A * | 9/1999 | Guezennec et al. | 215/262 |
| 6,137,413 | A * | 10/2000 | Ryan, Jr. | 340/572.8 |
| 6,298,990 | B1 * | 10/2001 | Amrod et al. | 206/459.1 |
| 6,335,691 | B1 * | 1/2002 | Bird | 340/691.1 |
| 2002/0130778 | A1 | 9/2002 | Nicholson | |

FOREIGN PATENT DOCUMENTS

| | | |
|---|---|---|
| DE | 201 15 621 U1 | 8/2002 |
| EP | 0 794 520 A | 9/1997 |
| EP | 1 083 519 A | 3/2001 |
| WO | 8803302 | 5/1988 |
| WO | WO 03/023705 A1 | 3/2003 |
| WO | WO 03/023706 A1 | 3/2003 |

* cited by examiner

*Primary Examiner*—Toan N. Pham
(74) *Attorney, Agent, or Firm*—Cooper & Dunham LLP

(57) ABSTRACT

A method of conducting a promotional contest by providing a portal that establishes a field for detecting the presence of a field-disturbing element, providing packages respectively having and lacking a concealed field-disturbing element, and distributing the packages randomly to different individuals who carry the packages past the portal so that a package with a field-disturbing element causes the portal to produce a signal indicating a winner of the contest. A can for beverages or the like having a field-disturbing element concealed thereon, for use in such a promotional contest. The element may be mounted in a peelable foil closure member covering an aperture in the can lid.

19 Claims, 4 Drawing Sheets

METHODS OF CONDUCTING PROMOTIONAL CONTESTS AND BEVERAGE CONTAINERS FOR USE THEREIN

BACKGROUND OF THE INVENTION

This invention relates to methods of conducting promotional contests, and to beverage or like containers having utility in such contests. More particularly, the invention is concerned with promotional contests in which the winners are purchasers or other recipients of articles (e.g., beverage cans) that are randomly commingled with seemingly identical articles but are differentiated therefrom by concealed indicia. In a specific sense, the invention is directed to methods of conducting these contests with electronic article surveillance systems, and especially to such methods wherein the articles are containers of beverages or the like.

Currently there is keen interest among can makers and fillers in features, for cans, that promote product sales and brand recognition. Among known techniques for promoting a product are contests in which one or a small number of "winning" packages with special but externally undetectable identifying features are randomly seeded among large batches of ordinary packages of the product as arrayed for sale at stores or other vending facilities. Contest advertising attracts attention to the brand, and aims to induce consumers to buy packages of the promoted product brand (rather than another brand) in the hope of obtaining a winning package which can be redeemed for a prize. Other contest-associated features, aimed at the five senses, are desirable to enhance interest in the contest and the product.

In this regard, the sense of hearing has been relatively little exploited. Promotions for certain consumable canned products have employed devices, contained in winning cans, that produce audible messages when the can is opened, advising the consumer that the can is a winner. These cans are seeded in batches of ordinary cans, from which they cannot be distinguished by visual inspection or heft. Substantial modifications of the can, however, are required to conceal the audio generating element. Moreover, the audio is triggered on opening the can, which may occur in private, so while there may be an enjoyable effect for the winning consumer, there is no way to exploit the publicity of the win on the spot unless the winning can is opened in public. Even in the latter situation, the audio volume achievable with the necessarily small device fitting inside the can limits the range over which the winning announcement will be heard.

Electronic article surveillance (EAS) systems are well known for security purposes such as theft prevention in retail stores. Such systems employ portals (typically adjacent store exits, so as to be passed by customers leaving a store) that create rf electromagnetic fields and detect and signal perturbations of the field. Field-disturbing elements in the form of passive rf resonant microcircuits are affixed to the articles of merchandise that are to be protected. Passage of an article bearing one of these microcircuits (in a non-disabled condition) through the field of a portal detectably disturbs the field, provided that the resonant frequency of the microcircuit and the field frequency are appropriately selected. The portal, sensing the disturbance, produces an audible and/or visible alarm signal indicative of unauthorized removal of an article from the store. To permit authorized removal of articles (i.e., by persons who have purchased them) without setting off an alarm, the microcircuits may be removed or disabled in situ on the articles by store personnel during the purchase transaction. As an alternative to rf fields and microcircuits, magnetic fields and magnetic field-disturbing elements may be used.

Several patents (e.g. U.S. Pat. Nos. 5,861,809; 5,754,110; 4,673,923; and 4,835,524, the disclosures of which are incorporated herein by this reference) describe the design and manufacture of such rf tags and overall EAS anti-theft systems based on these. EAS systems are commercially available for anti-theft applications.

Considerations of cost, convenience and feasibility have precluded use of EAS systems for various types of inexpensive consumer goods, including cans of beverages and the like. Beverage containers, for example, are commonly sold in vending machines or in prepackaged groups such as six-packs; these sales modes are incompatible with the provision, detection and/or disabling of rf microcircuits on individual cans.

SUMMARY OF THE INVENTION

The present invention, in a first aspect, broadly contemplates the provision of a method of conducting a promotional contest to determine, from among a number of individuals, a winner or winners of the contest. This method comprises providing at least one portal operable to establish a field and to detect, and produce a signal in response to, the presence of a field-disturbing element therein; providing a plurality of packages including at least one each of packages that respectively have and lack a field-disturbing element and are indistinguishable from each other by external human sensory inspection; distributing packages of the aforesaid plurality to different individuals in such manner that distribution of a package having a field-disturbing element is a random event; and operating the (or each) portal at a location at which individuals to whom the packages have been distributed introduce the packages to the field, whereby, when a package having a field-disturbing element is introduced to the field by an individual, the portal produces a signal indicating that the last-mentioned individual is a winner of the contest.

This method may employ a generally conventional EAS system of portals and (as field-disturbing elements) microcircuits, as described above, but instead of being used to detect attempted theft, with field-disturbing elements affixed to all articles of merchandise to be protected, it is used to identify "winning" packages, the microcircuits or other field-disturbing elements being affixed only to the winning packages. Typically, in the practice of the method, the field-disturbing elements are provided on only one or a small number of packages that are commingled with or seeded in a large number of ordinary packages having no field-disturbing element.

The field may be a magnetic field and the field-disturbing element may be a magnetic element detectable by the aforesaid one portal. Alternatively, the field may be a radio frequency electromagnetic field and the field-disturbing element may be a passive resonant microcircuit (hereinafter sometimes referred to simply as a circuit) having a resonant frequency such that presence of the circuit in the field is detected and signalled by the aforesaid one portal, i.e. as in a conventional EAS system.

Further in accordance with the invention, the packages may be beverage containers, especially containers of the type comprising a can for holding a quantity of a beverage, with the circuit disposed on a wall portion of the can. Preferably in at least many instances, the circuit is disposed on and concealed by a member adhered to the can. In certain currently preferred embodiments of the invention, wherein the can has a drinking aperture and a peelable foil closure member therefor, the closure member serves as the circuit-concealing member. This closure member may include a free tab portion and an aperture-covering portion, and the circuit may be disposed on the tab portion, or on the aperture-covering portion, or on both portions. The circuit may be printed on the foil closure member or disposed on a web that is laminated to the foil closure member.

Typically or preferably, the circuit is detectable by the portal while the peelable foil closure member is fully adhered to the can in aperture-closing position. As an alternative, however, the circuit may be activated (so as to be detectable by the portal) only upon peeling of the foil closure member sufficiently to open the aperture.

In other alternative embodiments, the circuit is located visibly on an external surface of the can, and each can lacking a field-disturbing element has a circuit-simulating design element located visibly on an external feature of the can to render cans respectively having and lacking field-disturbing elements indistinguishable from each other.

In a second aspect the invention contemplates the provision of a beverage container for use with a portal for creating an electrical or magnetic field and detecting and signalling the presence therein of a field-disturbing element, the beverage container comprising a can for holding a quantity of a beverage, and a field-disturbing element affixed to the can such that when the can is carried into the field, the portal signals the presence of the can therein. The invention in this aspect embraces cans having the various features described above.

In yet another aspect the invention contemplates the provision of an array of beverage containers for use with a portal for creating an electrical or magnetic field and detecting and signalling the presence therein of a field-disturbing element, each of the beverage containers comprising a can for holding a quantity of a beverage, at least a first of the cans having a field-disturbing element affixed thereto such that when the can is introduced to the field, the portal signals the presence of the can therein, and at least a second of the cans having no field-disturbing element affixed thereto such that when the can is introduced to the field, the portal does not signal the presence of the can therein, wherein the first and second cans are indistinguishable from each other by external human sensory inspection.

Further features and advantages of the invention will be apparent from the detailed description hereinafter set forth, together with the accompanying drawings.

DETAILED DESCRIPTION

Figure 1:
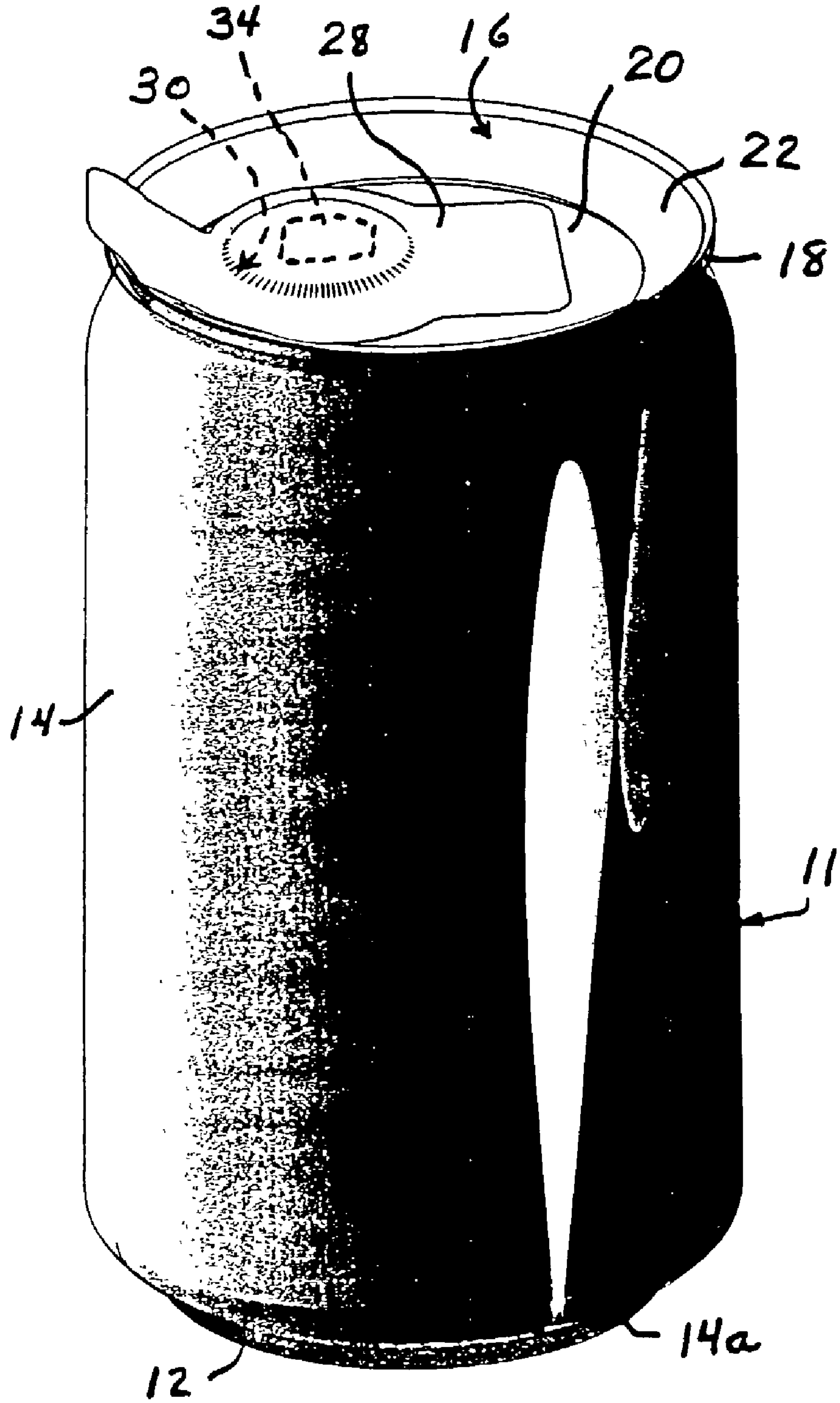
FIG. 1 is a perspective view of a can embodying the present invention in a particular form.

The invention will be described, for purposes of illustration, with reference to the provision and use of a beverage can of a type described in copending U.S. patent application Ser. No. 10/150,683, filed May 17, 2002, the entire disclosure of which is incorporated herein by this reference.

Referring to the drawings, this type of container is exemplified by a metal can 10 (FIG. 1) for holding a carbonated beverage such as soda or beer. The can 10 includes a one-piece can body 11 constituting the bottom 12 and continuous, upright, axially elongated, generally cylindrical side wall 14 of the can, and a lid 16 which, after the can has been filled with the beverage, is peripherally secured to the open top end of the can body to provide a complete, liquid-tight container.

The body 11 may be an entirely conventional drawn-and-ironed aluminum alloy can body, identical in structure, alloy composition, method of fabrication, configuration, gauge, dimensions and surface coatings to can bodies currently commercially used for carbonated and other beverages (alternatively, for example, the body may be a steel can body, such as are in common use in Europe). In particular, and in common with known can bodies, the bottom 12 of the body 11 is externally concave and the open top end of the body has a circular edge 18 lying in a plane perpendicular to the vertical geometric axis of the side wall 14. The terms "aluminum" and "aluminum alloy" are used interchangeably herein to designate aluminum metal and aluminum-based alloys.

Except as hereinafter described, the lid 16 may also be a generally conventional aluminum alloy lid member of the type currently commercially used for beverage cans having drawn and ironed one-piece can bodies such as the body 11. Thus, the alloy of which it is constituted, the steps and procedures employed in its fabrication, and its general overall configuration, dimensions, gauge and surface coatings as well as the manner in which it is secured to the top edge 18 of the can body 11, may all be the same as in the case of present day can lids well-known in the art.

In particular, the lid 16 is substantially rigid, and has a substantially flat upper surface 20 with a circular periphery, around which is formed a raised annular rim 22 projecting upwardly above the plane of the flat upper surface 20. When the lid is mounted on the open upper end of a beverage-filled can body, in known manner, the rim 22 engages the upper edge 18 of the can body; the circular flat surface 20 lies substantially in a horizontal plane, perpendicular to the vertical geometric axis of the cylindrical side wall 14, and is centered with respect to the latter axis. The lower end 14*a* of the side wall 14 of the can 10 is shaped (tapered) to interfit with the rim 22 of the lid of another identical can, when the cans are stacked vertically.

The lid 16 is arranged to provide an aperture through which the beverage contained in the can may be poured or removed by drinking directly from the can, either with a straw inserted through the aperture or by juxtaposition of the consumer's mouth to the aperture. Specifically, the lid has a pre-formed open aperture 24, and a peelable, flexible closure member 28 covering the aperture. In order to achieve adequate burst resistance (against internal pressure caused by contained carbonated beverages) without requiring excessive force to peel the closure member, a shallow frustoconical annular flange 30 is formed in the lid within the area of the flat upper surface 20, to surround and define the aperture 24 and to provide a seat for the closure member.

The flexible closure member 28 is constituted of a sheet material comprising metal foil, e.g. aluminum foil; in the described embodiment of the invention, the closure member is fabricated of a suitably lacquered aluminum foil sheet or an aluminum foil-polymer laminate sheet. Stated more broadly, materials that may be used for the closure member include, without limitation, lacquer coated foil (where the lacquer is a suitable heat seal formulation); extrusion coated foil (where the polymer is applied by a standard or other extrusion coating process); the aforementioned foil-polymer laminate, wherein the foil is laminated to a polymer film using an adhesive tie layer; and foil-paper-lacquer combinations such as have heretofore been used for some low-cost packaging applications.

The closure member extends entirely over the aperture 24 and is secured to the flange outer surface 32 by a heat seal extending at least throughout the area of an annulus entirely surrounding the aperture. Thereby the closure member is bonded to the flange 30, covering and closing the aperture 24, before the lid member 16 is secured to a can body 11 filled with a carbonated beverage. Once the lid has been mounted on the body to complete the enclosure of the beverage, elevated pressure generated by the beverage acts on the inner surface portion of closure member 28 which is exposed through the aperture to the interior of the can, causing the flexible closure member to bulge outwardly.

Figure 2:
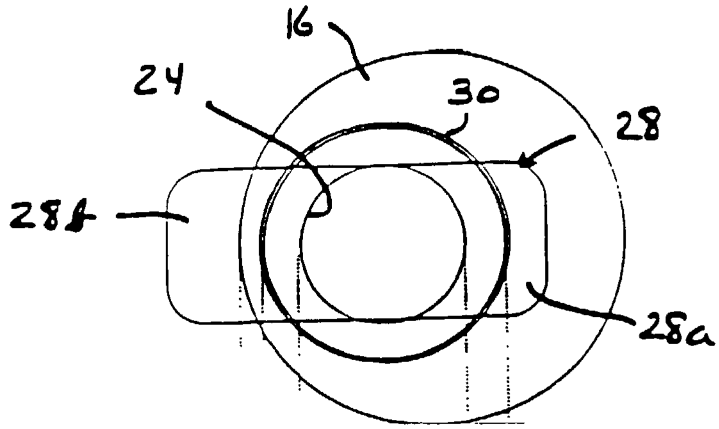
FIG. 2 is a simplified and somewhat schematic top plan view of the can of FIG. 1.
Figure 3:
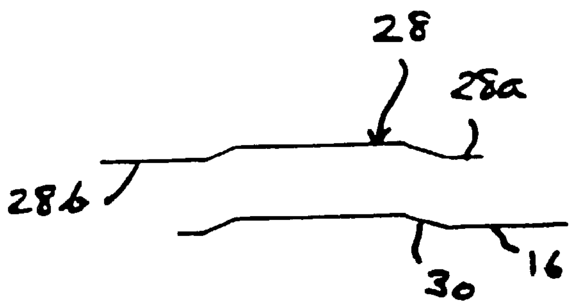
FIG. 3 is an exploded diagrammatic elevational sectional view of the can lid and closure member of FIG. 1.
Figure 4:
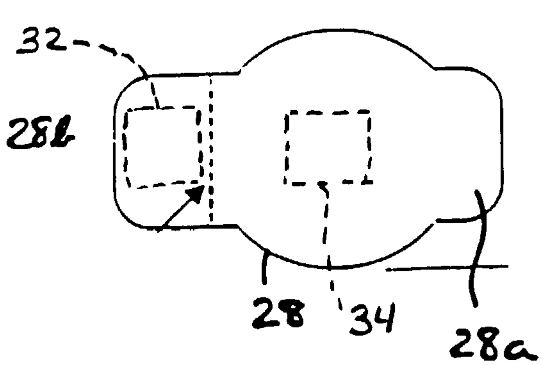
FIG. 4 is a plan view of the closure member of FIG. 1.

FIGS. 2–4 illustrate further the configuration and arrangement of the flange, aperture and closure member at the top of the can in the embodiment of FIG. 1. With a circular can lid member 16 having a diameter of 48 mm, mountable on a can body having a correspondingly dimensioned circular open upper end, a circular aperture 24 having a diameter of 20 mm is defined by a frustoconical annular flange 30 having a maximum diameter (in the plane of lid surface 20) of 30 mm. As best seen in FIG. 4, the foil-polymer laminate closure member 28 has a circular central portion 32 mm in diameter (large enough to completely overlie the sloping outer surface of the flange), with a short projection 28*a* on one side for overlying part of the flat upper surface of the lid and an integral tab portion 28*b* on the opposite side which, outwardly of the flange 30, is not heat sealed but is free to be bent and pulled. The exploded diagrammatic elevational view of FIG. 3 indicates the relative positions of the can lid 16 and the closure member 28, as well as the folding of the tab. The closure member is subjected to a preliminary forming step to impart a frustoconical shape (also indicated in FIG. 3) to its circular central portion for proper seating on and sealing to the flange 30.

The aperture 24 is shown in FIG. 2 as being disposed eccentrically of the geometric center (center of symmetry) of the can lid 16, i.e., relatively close to the edge of the lid, so that a user can easily bring the aperture to his or her mouth for drinking the contained beverage directly from the can. However, depending on use and contents, different positions for the aperture may be employed. Also, if desired, aperture configurations other than the circular shape shown may be provided.

Illustratively, the foil closure stock may be a suitable aluminum foil (e.g. made of alloy AA3104 or of a conventional foil alloy such as AA3003, 8011, 8111, 1100, 1200) with a foil gauge of 0.002"–0.004" (≈50$\mu$ to 100$\mu$) which is either lacquered on one side with a suitable heat sealable lacquer, or laminated on one side with a suitable heat sealable polymer film (e.g., polyethylene, polypropylene, etc.), 0.001"–0.002" (≈25$\mu$ to 50$\mu$) thick. The other (outwardly exposed) side should have a suitable protective lacquer coating.

In order to seal to the aperture, the closure members 28 with their described integral pull tabs are formed and stamped out from the foil laminate stock using a suitable press (standard presses can be used with tooling specifically designed for these closure members). In the embodiment where the frustoconical flange is preformed, the foil closure members are preshaped (by a drawing process) so that they will fit over the raised aperture of the lid.

A heat sealing machine with suitable tooling is used to heat seal the closures to the can lid. The heat sealing conditions are dependent on the polymer and heat seal coating formulation used. The temperature of the bottom heat sealing tool should be selected so that the coating on the inside of the lid member should not be significantly softened or melted during the heat sealing operation. For the commonly used can end coatings and for heat seal dwell times of about 0.3 sec. or less, the temperature should be less than about 220° C. and preferably about 200° C. or below. The upper tool temperature is set to ensure that the heat seal bond is achieved in an acceptably short time. Typical commercial heat sealing machines have dwell times of 0.3 sec. The dwell time, pressure and temperatures may be optimized for the particular heat seal application. Heat sealing the closure to the lid involves use of a customized heat sealing line (such as those built by Hans Rychiger AG, Steffisburg, Switzerland), with appropriately constructed heat seal tooling provided to bond the closure to the angled aperture.

In accordance with the present invention, and as a particular feature thereof, in the embodiments now to be described, the can of FIGS. 1–4 is provided with an rf resonant microcircuit, typically or illustratively a conventional circuit as employed in present-day EAS systems, capable of disturbing the rf field of a portal so as to cause an audible and/or visible alarm or signal to be produced when the can, bearing the circuit, passes through the field of the portal.

Rf resonant microcircuits are now widely used to discourage theft in retail stores. In one common type of application, the circuit is affixed to a merchandise article at the manufacturer. Portals located at the store checkout produce an rf field that is sensed by the circuit. The circuit is a resonant circuit that absorbs energy from the rf field and perturbs it enough that the change in field can in turn be sensed by a detector in the portal which issues an alarm. Circuits are tuned, by design of the circuit, to a specific frequency used by a given store location so as to avoid the possibility of accidental triggering by spurious signals. Some circuits are sensitive to a second rf frequency and when they are resonant, sufficient ac current passes in the circuit to fuse a narrow, thin conductor element which breaks the circuit and de-activates the circuit so that the customer can exit and re-enter the store after the initial purchase without triggering the alarm.

Figure 5A:
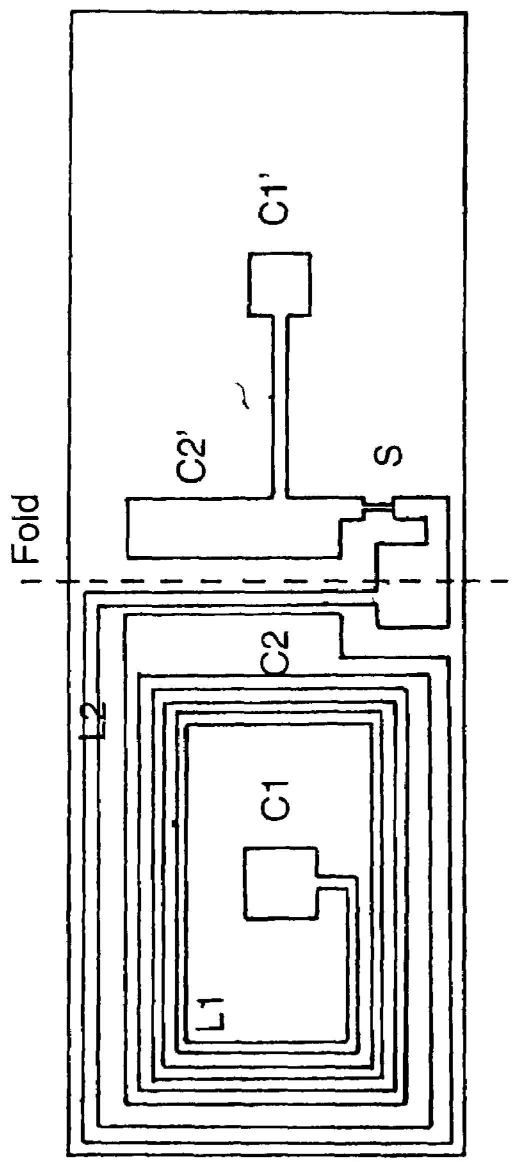
FIG. 5A is a view of a design for a folded rf resonant circuit for use as the field-disturbing element in embodiments of the invention.
Figure 5B:
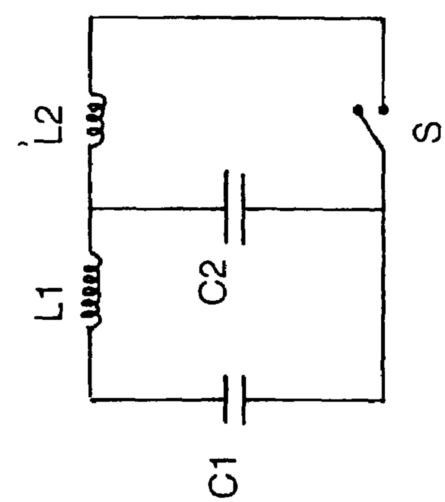
FIG. 5B is a diagram of the LC resonant circuit corresponding to the circuit of FIG. 5A.
Figure 6A:
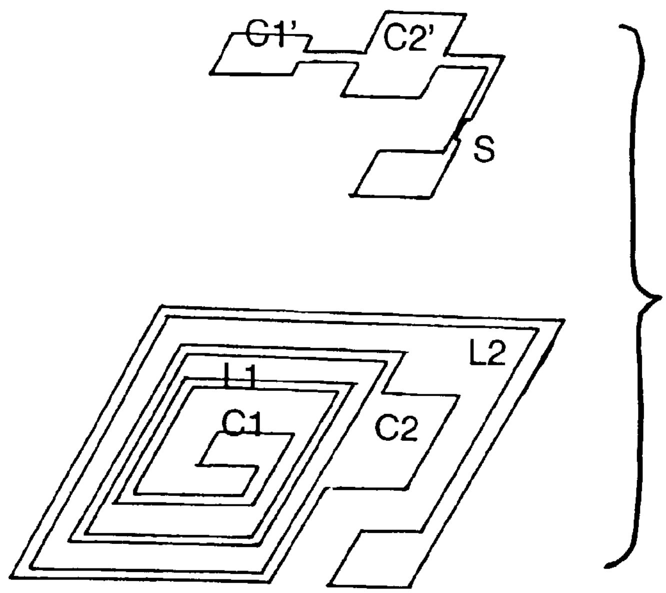
FIG. 6A is a view of an rf resonant circuit for use as the field-disturbing element in embodiments of the invention, shown as two circuit elements in overlaid arrangement, i.e., disposed one on top of the other in register, as they would be bonded or folded together with an intervening dielectric layer (not shown)
Figure 6B:
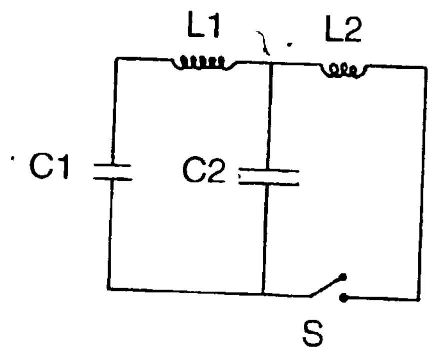
FIG. 6B is a diagram of the LC resonant circuit corresponding to the circuit of FIG. 6A.
Figure 7:
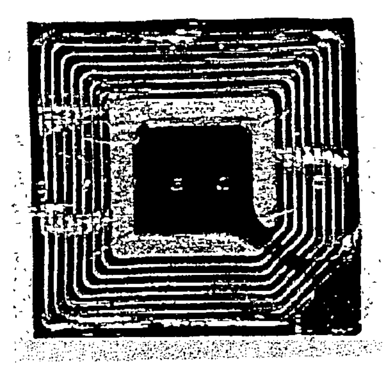
FIG. 7 is a plan view of a typical commercial rf resonant microcircuit as used in present-day EAS systems.

Rf resonant microcircuits of this type are manufactured by laminating thin aluminum foil to a polymer backing, printing the desired circuit on the foil with photo resist, spray etching away the aluminum in areas outside the circuit elements and removing the photo resist. A complete tag consists of two such circuits that are bonded together with an intervening polymer layer that acts as the dielectric in the capacitor elements of the circuit and as an insulator between conductive elements in the two circuits. The etched laminate is produced by a continuous web processing in a coil-to-coil operation with many circuits produced simultaneously across the web width. Individual circuits are then die cut and laminated to polymer film or paper to form labels or tags. The two circuits can be fabricated on either side of the same polymeric support film, starting with a foil/polymer/foil laminate; in this case, the two circuits are joined electrically at specific points, for example, by ultrasonic welding through the intervening polymer layer. The two circuits may also be fabricated in adjacent areas on the same side of a foil/polymer laminate (not shown) and then folded over with an intervening polymer film (not shown) sandwiched between. FIGS. 5A and 5B respectively show such a folded design and the corresponding LC resonant circuit. FIGS. 6A and 6B respectively show the two circuit elements disposed one on top of the other in registry, and the corresponding LC circuit; these elements would be bonded/folded together with an intervening dielectric layer. The assembled circuit with its intervening dielectric layer is sometimes referred to as an rf tag. FIG. 7 illustrates an actual rf tag used in current commercial EAS systems, and of a type that may be employed in the present invention.

A typical rf tag of the type represented in FIGS. 5–7 might consist of 6 $\mu$m foil laminated to 25 $\mu$m polyethylene in turn laminated to 50 $\mu$m foil. RF tags are about 2 cm square and respond in the frequency range 5–10 MHZ. Details of the design, construction, fabrication and functioning of these rf tags are set forth, for example, in one or more of the aforementioned U.S. Pat. Nos. 5,861,809; 5,754,110; 4,673,923; and 4,835,524.

The present invention, in a first aspect, contemplates the provision of a promotional contest method and system in which foil labels on selected cans contain an embedded microcircuit which triggers a portal at a store, vending machine, sporting event, etc., to announce the winner of a contest. The circuit may be similar to devices used routinely in merchandise tags as part of a store's electronic anti-theft system; but, in the present invention, is used on a can for promotional purposes. Preferably the circuit is embedded in the foil seal (closure member 28) of a can 10 having a peelable lid design as described above so that the "winning" cans are indistinguishable from the others. In another embodiment, the circuit is inactive until the can is opened by peeling back the foil seal.

There are a variety of ways in which the rf resonant circuit may be positioned in the foil seal or closure member 28. For example, it may fit onto the tab portion 28*b* only, as indicated at 32 in FIG. 4; alternatively, it may fit into the part of the closure member covering the aperture, as indicated at 34 in FIG. 4; or it may be incorporated into the entire area of the closure member. In each of these arrangements, the circuit may be either printed directly onto the foil of the closure member or attached pre-made from another web material, forming a laminate with the foil of the closure member.

As yet another alternative, the circuit can be simply printed directly onto the side of the can or lid; but in this case, to render the "winning" cans having operative circuits indistinguishable from the others, all cans in an array seeded with one or more "winners" must be provided with circuits, some of which would be dummies, incapable of disrupting the rf field of a portal.

In a second aspect, the invention contemplates the provision of a can incorporating a thin aluminum foil label or peelable member containing a passive antenna circuit such as a radio frequency resonant circuit. When a can with such a label or member passes a detection portal, the circuit triggers an audible or visible response that can be used to announce a prize winner. The portal may be a checkout station at a grocery store, the delivery chute of a vending machine or a passageway fixture at a stadium, trade show, etc. The foil circuit can be affixed to the sidewall, lid or dome of the can, suitably camouflaged. Again, as described above, preferably, the circuit is incorporated into a foil-based closure or peelable lid where it is undetectable prior to activation. In some embodiments, the circuit is inactive until the lid is opened by peeling back the foil.

The present invention may use available rf tags and detector systems including portals. Tags that sense magnetic fields are also available and may be used in situations where shielding of the rf fields by metal structures may pose a problem. These operate similarly and are included within the scope of the present invention.

The can of the invention carries only a very thin passive label that activates an audio system that is contained in the portal. The winning announcement takes place in public, over a pre-designed range and with appropriate volume. Of course, the effect can occur only where there are portals so that the venue for winning cans is somewhat limited and has to be chosen in advance. This may also impact perceptions of the fairness of the contest. Both limitations are removed if the promotion is targeted at a specific event such as a sporting event or a concert.

The thin foil label can be incorporated on the outside of the can, with similar-looking labels, but not containing circuits, applied to all cans so that the winning cans are indistinguishable. Preferred, though, are arrangements where a foil label is already part of the construction of a container so that a few winning circuits can be seeded into an otherwise normal looking product. This would apply to containers with peelable closure members or peelable foil lidding.

In particular embodiments with a peelable foil member or lid, a narrow conductive element in the circuit, usually designed to fuse on rf excitation and de-activate the circuit, is instead broken by peeling open the lid thereby activating the previously inactive circuit. In this way, the can is activated only after opening. This may provide some desirable time delay between point of purchase and activation.

The concept of merchandise carrying a winning label that is activated in public has application in a variety of retail situations. The specific realization in terms of a foil-based lid or peelable closure member has applications for any packaged goods incorporating a foil lid or such a member.

It is to be understood that the invention is not limited to the specific features and embodiments hereinabove specifically set forth, but may be carried out in other ways without departure from its spirit.

What is claimed is:

1. A method of conducting a promotional contest to determine, from among a number of individuals, a winner or winners of the contest, said method comprising:

(a) providing at least one portal operable to establish a field and to detect, and produce a signal in response to, the presence of a field-disturbing element therein, (b) providing a plurality of packages including at least one each of packages that respectively have and lack a field-disturbing element and are indistinguishable from each other by external human sensory inspection, (c) distributing packages of said plurality to different individuals in such manner that distribution of a package having a field-disturbing element is a random event, and (d) operating said one portal at a location at which individuals to whom said packages have been distributed introduce said packages to said field, whereby, when a package having a field-disturbing element is introduced to the field by an individual, the portal produces a signal indicating that said last-mentioned individual is a winner of the contest.

2. A method according to claim 1, wherein said field is a magnetic field and said field-disturbing element is a magnetic element detectable by said one portal.

3. A method according to claim 1, wherein said field is a radio frequency electromagnetic field and said field-disturbing element is a passive resonant microcircuit having a resonant frequency such that presence of the circuit in the field is detected and signalled by said one portal.

4. A method according to claim 1, wherein each said package is a beverage container.

5. A method according to claim 4, wherein said one package having a field-disturbing element is a beverage container comprising a can for holding a quantity of a beverage, and said field-disturbing element is affixed to the can such that when the can is carried into the field, the portal signals the presence of the can therein.

6. A method according to claim 5, wherein the field is a magnetic field and said field-disturbing element is a magnetic element detectable by the portal.

7. A method according to claim 5, wherein the field is a radio frequency electric field and the field-disturbing element is a passive electric circuit having a resonant frequency such that presence of the circuit in the field is detected and signalled by the portal.

8. A method according to claim 7, wherein the can has a wall portion and the circuit is disposed thereon.

9. A method according to claim 7, wherein the circuit is disposed on and concealed by a member adhered to the can.

10. A method according to claim 9, wherein the can has a drinking aperture and a peelable foil closure member therefor, said closure member being said member adhered to the can.

11. A method according to claim 10, wherein the circuit is printed on the peelable foil closure member.

12. A method according to claim 10, wherein the circuit is disposed on a web that is laminated to the peelable foil closure member.

13. A method according to claim 10, wherein the circuit is detectable by the portal while the peelable foil closure member is fully adhered to the can in aperture-closing position.

14. A method according to claim 10, wherein the circuit is activated so as to be detectable by the portal only upon peeling of the foil closure member sufficiently to open the aperture.

15. A method according to claim 9, wherein the peelable foil closure member includes a free tab portion and an aperture-covering portion.

16. A method according to claim 15, wherein the circuit is disposed on said tab portion.

17. A method according to claim 15, wherein the circuit is disposed on said aperture-covering portion.

18. A method according to claim 15, wherein the circuit is disposed on both said tab portion and said aperture-covering portion.

19. A method according to claim 7, wherein the circuit is located visibly on an external surface of the can, and wherein each can lacking a field-disturbing element has a circuit-simulating design element located visibly on an external feature of the can to render cans respectively having and lacking field-disturbing elements indistinguishable from each other.

* * * * *